(12) United States Patent
Bartkovsky

(10) Patent No.: US 9,810,014 B1
(45) Date of Patent: Nov. 7, 2017

(54) SAND SAFES SYSTEM

(71) Applicant: Maria J. Bartkovsky, Kenneth City, FL (US)

(72) Inventor: Maria J. Bartkovsky, Kenneth City, FL (US)

( * ) Notice: Subject to any disclaimer, the term of this patent is extended or adjusted under 35 U.S.C. 154(b) by 0 days.

(21) Appl. No.: 14/560,506

(22) Filed: Dec. 4, 2014

(51) Int. Cl.
  *E05G 1/00* (2006.01)
  *E05G 1/026* (2006.01)
  *A01B 1/02* (2006.01)

(52) U.S. Cl.
  CPC .............. *E05G 1/005* (2013.01); *A01B 1/02* (2013.01); *E05G 1/026* (2013.01)

(58) Field of Classification Search
  CPC .. A01B 1/02; E05G 1/00; E05G 1/005; E05G 1/026; E05G 2700/00; E05G 2700/02
  USPC ............. 70/63, DIG. 81; 109/22, 23, 50–52; 40/664, 665; 220/484, 694
  See application file for complete search history.

(56) References Cited

U.S. PATENT DOCUMENTS

| | | | | |
|---|---|---|---|---|
| 4,162,789 A * | 7/1979 | Hollaway | | 473/499 |
| 4,186,687 A * | 2/1980 | Gilpatric | | 119/241 |
| 4,436,214 A * | 3/1984 | Henderson | | 220/628 |
| 4,667,491 A * | 5/1987 | Lokken et al. | | 70/63 |
| 5,153,561 A * | 10/1992 | Johnson | | 340/571 |
| 5,199,361 A * | 4/1993 | Robinson | | 109/51 |
| 5,595,073 A * | 1/1997 | Sullivan | | 70/18 |
| 5,970,922 A * | 10/1999 | Lin | | 119/867 |
| 6,082,157 A * | 7/2000 | Boyce | | 70/58 |
| 6,085,671 A * | 7/2000 | Kerr et al. | | 109/51 |
| 6,199,412 B1 * | 3/2001 | Kennedy | | 70/18 |
| 6,604,390 B1 * | 8/2003 | Nooner | | 70/63 |
| 6,637,153 B2 * | 10/2003 | Gies | | 47/65.5 |
| 7,305,858 B1 * | 12/2007 | Wu | | 70/58 |
| 7,461,527 B2 * | 12/2008 | Yu | | 70/18 |
| 2004/0045329 A1 * | 3/2004 | Farnham et al. | | 70/63 |
| 2007/0068204 A1 * | 3/2007 | Brewer | | 70/63 |
| 2008/0053346 A1 * | 3/2008 | Hagar | | 109/50 |
| 2009/0241813 A1 * | 10/2009 | Gray | | 109/50 |
| 2010/0281930 A1 * | 11/2010 | Hacker | | 70/14 |
| 2010/0308604 A1 * | 12/2010 | Pauken et al. | | 292/169.14 |
| 2012/0298018 A1 * | 11/2012 | McCabe | | 109/51 |
| 2014/0137777 A1 * | 5/2014 | Counas | | 109/50 |
| 2015/0000571 A1 * | 1/2015 | Stemen | | 109/23 |

* cited by examiner

*Primary Examiner* — Lloyd Gall

(57) ABSTRACT

A container has an open top and a removable lid. A marker has a bottom with a recess. A post having opposed ends is supported in the recess. A strap has a lower end attached to the container. The strap has an upper end with spaced mating fasteners adapted to be coupled together to form a loop. The loop is adapted to encompass the post during use.

3 Claims, 3 Drawing Sheets

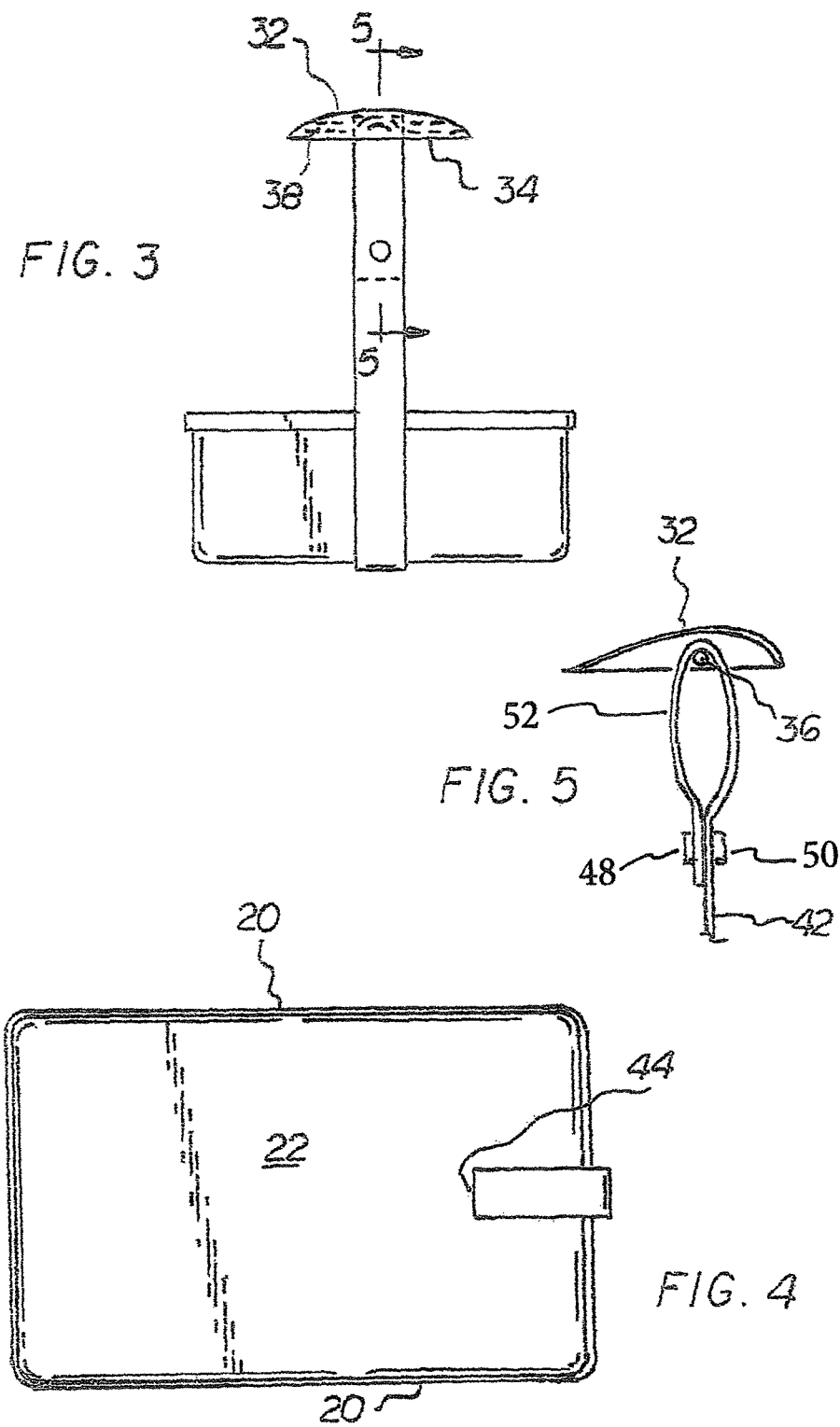

SAND SAFES SYSTEM

BACKGROUND OF THE INVENTION

Field of the Invention

The present invention relates to a sand safes system and more particularly pertains to burying valuables in sand at a beach and unobtrusively marking the beach to identify a location of the burying, the burying and the marking being done in a safe, secure, convenient, and economical manner.

Description of the Prior Art

The use of systems for keeping valuables safe and hidden at a beach of known designs and configurations is known in the prior art. More specifically, systems for keeping valuables safe and hidden at a beach of known designs and configurations previously devised and utilized for the purpose of keeping valuables safe and hidden from view at a beach are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe sand safes system that allows burying valuables in sand at a beach and unobtrusively marking the beach to identify a location of the burying, the burying and the marking being done in a safe, secure, convenient, and economical manner.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Therefore, it can be appreciated that there exists a continuing need for a new and improved sand safes system which can be used for burying valuables in sand at a beach and unobtrusively marking the beach to identify a location of the burying, the burying and the marking being done in a safe, secure, convenient, and economical manner. In this regard, the present invention substantially fulfills this need.

SUMMARY OF THE INVENTION

In view of the disadvantages inherent in the known types of safe systems of known designs and configurations now present in the prior art, the present invention provides an improved sand safes system. As such, the general purpose of the present invention, which will be described subsequently in greater detail, is to provide a new and improved sand safes system and method which has all the advantages of the prior art and none of the disadvantages.

To attain this, from a broad viewpoint, the present invention is a sand safes system. First provided is a container having an open top and a removable lid. A marker has a bottom with a recess. A post having opposed ends is supported in the recess. A strap has a lower end attached to the container. The strap has an upper end with spaced mating fasteners adapted to be coupled together to form a loop. The loop is adapted to encompass the post during use. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved sand safes system which has all of the advantages of the prior art systems for keeping valuables safe and hidden at a beach of known designs and configurations and none of the disadvantages.

It is another object of the present invention to provide a new and improved sand safes system which may be easily and efficiently manufactured and marketed.

It is further object of the present invention to provide a new and improved sand safes system which is of durable and reliable constructions.

An even further object of the present invention is to provide a new and improved sand safes system which is susceptible of a low cost of manufacture with regard to both materials and labor, and which accordingly is then susceptible of low prices of sale to the consuming public, thereby making such sand safes system economically available to the buying public.

Lastly, another object of the present invention is to provide a sand safes system for burying valuables in sand at a beach and unobtrusively marking the beach to identify a location of the burying, the burying and the marking being done in a safe, secure, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view of the system taken along line 3-3 of FIG. 1.

FIG. 4 is a bottom view of the system taken along line 4-4 of FIG. 1.

FIG. 5 is a cross sectional view of the system taken along line 5-5 of FIG. 3.

The same reference numerals refer to the same parts throughout the various Figures.

DESCRIPTION OF THE PREFERRED EMBODIMENT

Figure 1:
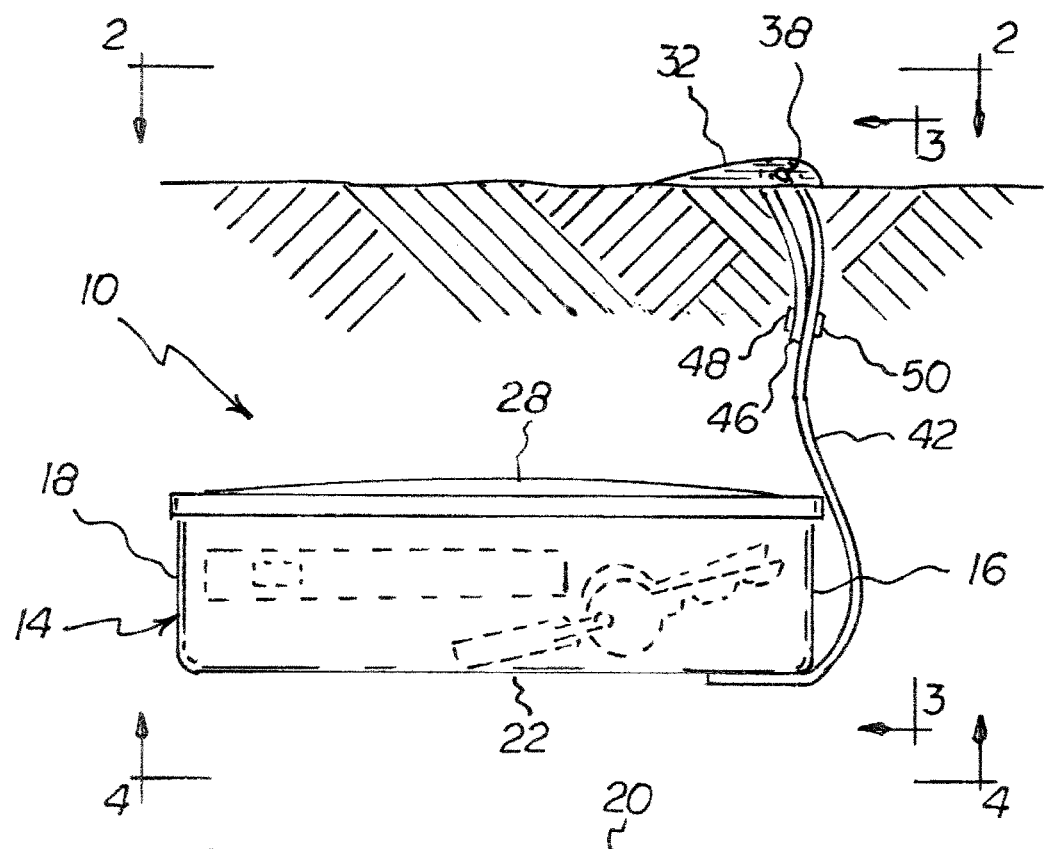
FIG. 1 is a side elevational view of a sand safes system constructed in accordance with the principles of the present invention.
Figure 2:
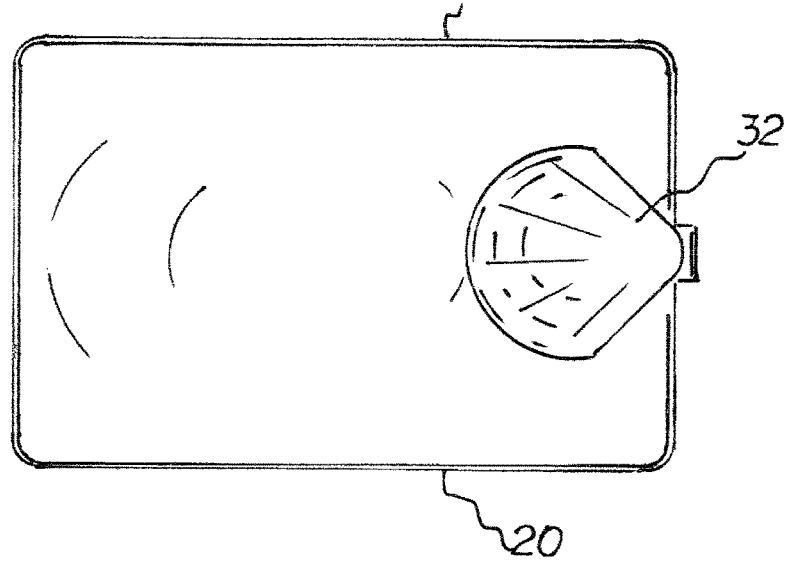
FIG. 2 is a plan view of the system taken along line 2-2 of FIG. 1.
Figure 6:
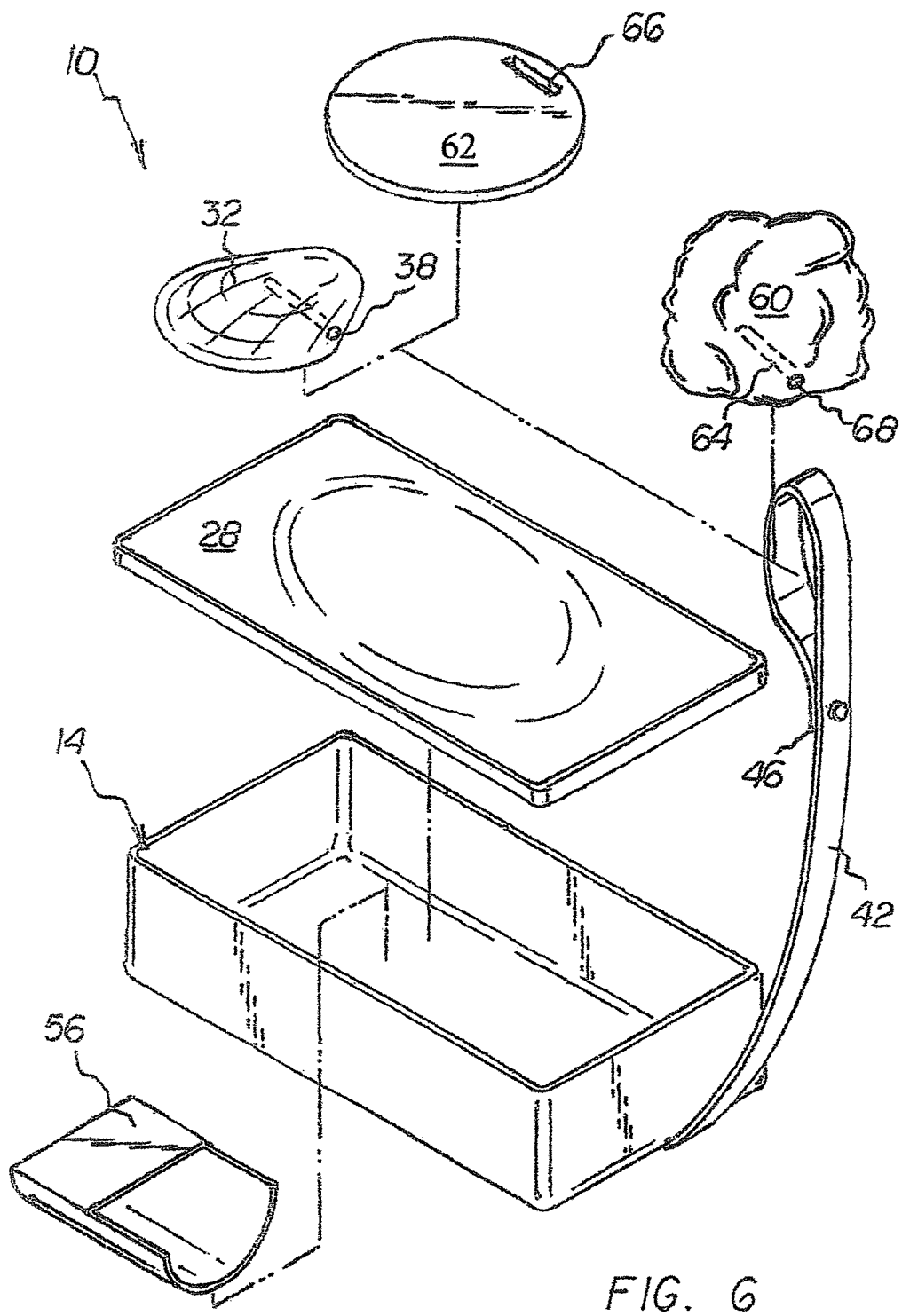
FIG. 6 is an exploded perspective illustration of the system of the prior Figures.

With reference now to the drawings, and in particular to FIG. 1 thereof, the preferred embodiment of the new and improved sand safes system embodying the principles and concepts of the present invention and generally designated by the reference numeral 10 will be described.

The present invention, the sand safes system 10 is comprised of a plurality of components. Such components in their broadest context include a container, a lid, a marker, and a strap. Such components are individually configured and correlated with respect to each other so as to attain the desired objective.

From a specific viewpoint, the present invention is a sand safes system. First provided is a container 14. The container is generally rectilinear in configuration. The container has a front face 16. The container has a rear face 18. The front face and the rear face are separated by a length of 11.5 inches, plus or minus 20 percent. The container has two side faces 20. The side faces are separated by a width of 7.5 inches, plus or minus 20 percent. The container has a lower face 22. The container further has an open top. The open top and the lower face are separated by a height of 3.75 inches, plus or minus 20 percent.

A rectangular lid 28 is provided. The rectangular lid is adapted to removably cover the open top of the container. The container and the lid are fabricated of plastic.

Also provided is a marker 32. In the preferred embodiment, the marker is in the shape of a seashell. The marker has a bottom 34. The bottom has a circular recess 36. The marker has a post 38. The post has opposed ends. The post is supported in the recess.

Provided next is a strap 42. The strap is fabricated of a flexible, inextensible material. The strap has a lower end 44. The lower end is attached to the lower surface of the container. The lower end is parallel with the side plates. The lower end is equally spaced from the side plates. The strap has an upper end 46. The upper end has spaced mating snaps 48, 50. The snaps are adapted to be coupled together to form a loop 52. The loop is adapted to encompass the post during use. The strap between the lower end and the loop is from 1.5 feet and 3.0 feet in length.

Further provided is a shovel 56. The shovel is positionable in the container. Valuables to be buried and protected are also positionable in the container. The shovel is adapted to dig a hole in the sand for the container with the valuables. The shovel is fabricated of plastic.

Provided last are supplemental optional markers. The supplemental optional markers include a rock 60 and a flat disk 62. Each of the supplemental optional markers has a supplemental recess 64, 66. Each of the supplemental markers has a supplemental post 68. In this manner the supplemental post may be positioned in the loop.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sand safes system comprising:
    a container in a generally geometric configuration and having an open top;
    a geometric lid adapted to removably cover the open top of the container;
    a plurality of markers, each marker having a bottom and laterally spaced recesses, a plurality of posts, one for each marker, each post having laterally spaced opposed ends supported in the associated recesses, each marker having a shape chosen from the class of shapes consisting of a seashell, disk, and a rock;
    a strap having a lower end attached to the container, the strap having an upper end formed with spaced mating fasteners adapted to be coupled together for forming a loop, the loop adapted to encompass the posts during use.

2. The system as set forth in claim 1 and further including:
    a shovel positionable in the container along with valuables to be buried and protected, the shovel adapted to dig a hole in the sand for the container with the valuables.

3. A sand safes system (10) for burying valuables in sand at a beach and unobtrusively marking the beach to identify a location of the burying, the burying and the marking being done in a safe, secure, convenient, and economical manner, the system comprising, in combination:
    a container (14) in a generally rectilinear configuration and having a front face (16) and a rear face (18) separated by a length of 11.5 inches, plus or minus 20 percent, and having two side faces (20) separated by a width of 7.5 inches, plus or minus 20 percent, and having a lower face (22) and an open top separated by a height of 3.75 inches, plus or minus 20 percent;
    a rectangular lid (28) adapted to removably cover the open top of the container, the container and the lid being fabricated of plastic;
    a plurality of markers (32) (60) (62), each marker having a bottom (34) and laterally spaced recesses (36) (64) (66), a plurality of posts (38) (68), one for each marker, each post having laterally spaced opposed ends supported in the associated recesses, each marker having a shape chosen from the class of shapes consisting of a seashell (32), a disk (62), and a rock (60);

a strap (42) fabricated of a flexible, inextensible material, the strap having a lower end (44) attached to the lower face of the container parallel with and equally spaced from the side faces, the strap having an upper end (46) formed with spaced mating snaps (48) (50), the snaps adapted to be coupled together for forming a loop (52), the loop adapted to encompass the post during use, the strap between the lower end and the loop being from 1.5 feet and 3.0 feet in length; and a shovel (56) positionable in the container along with valuables to be buried and protected, the shovel adapted to dig a hole in the sand for the container with the valuables, the shovel being fabricated of plastic.

\* \* \* \* \*